(12) United States Patent
Blichmann

(10) Patent No.: US 8,146,484 B2
(45) Date of Patent: Apr. 3, 2012

(54) LAUTER TUN FALSE BOTTOM

(76) Inventor: John Richard Blichmann, Lafayette, IN (US)

( * ) Notice: Subject to any disclaimer, the term of this patent is extended or adjusted under 35 U.S.C. 154(b) by 834 days.

(21) Appl. No.: 12/157,992

(22) Filed: Jun. 16, 2008

(65) Prior Publication Data

US 2008/0311262 A1 Dec. 18, 2008

(51) Int. Cl.
*C12C 7/04* (2006.01)
*C12M 1/02* (2006.01)

(52) U.S. Cl. ............ 99/276; 99/278; 99/418; 210/515; 210/522; 435/291.1; 435/291.2; 426/16; 426/29; 426/489; 426/592; 426/627

(58) Field of Classification Search ............... 99/276, 99/278, 418, 415, 456; 435/291.1, 291.2; 426/627, 489, 490, 495, 592, 16, 29; 210/521, 210/522, 513, 515
See application file for complete search history.

(56) References Cited

U.S. PATENT DOCUMENTS

| 283,494 | A | * | 8/1883 | Kropff | 435/185 |
| 1,627,285 | A | * | 5/1927 | Hubbard | 99/418 |
| 4,837,156 | A | * | 6/1989 | Lampinen | 435/291.2 |
| 6,187,359 | B1 | * | 2/2001 | Zuccarini | 426/505 |
| 2009/0285971 | A1 | * | 11/2009 | Broderick | 426/627 |

* cited by examiner

*Primary Examiner* — Reginald L Alexander

(57) ABSTRACT

A system for filtering spent grains from unfermented beer is disclosed. The system has a pot assembly having a stock pot wall, lid, drain tube and outlet valve. A louvered false bottom is positioned in the pot assembly and forms an opening between the false bottom and the stock pot wall. The louvered false bottom has a plurality of raised louvers spaced over the false bottom. Each of the louvers has a top surface, a bottom surface, a leg and a slot. The slot can be made larger or smaller according to the grain crush size.

19 Claims, 9 Drawing Sheets

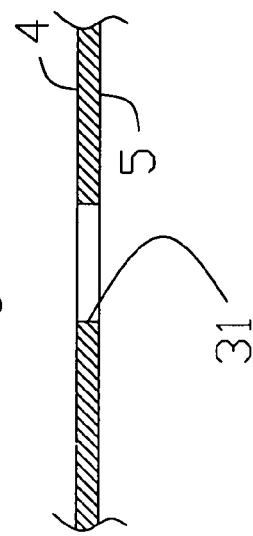
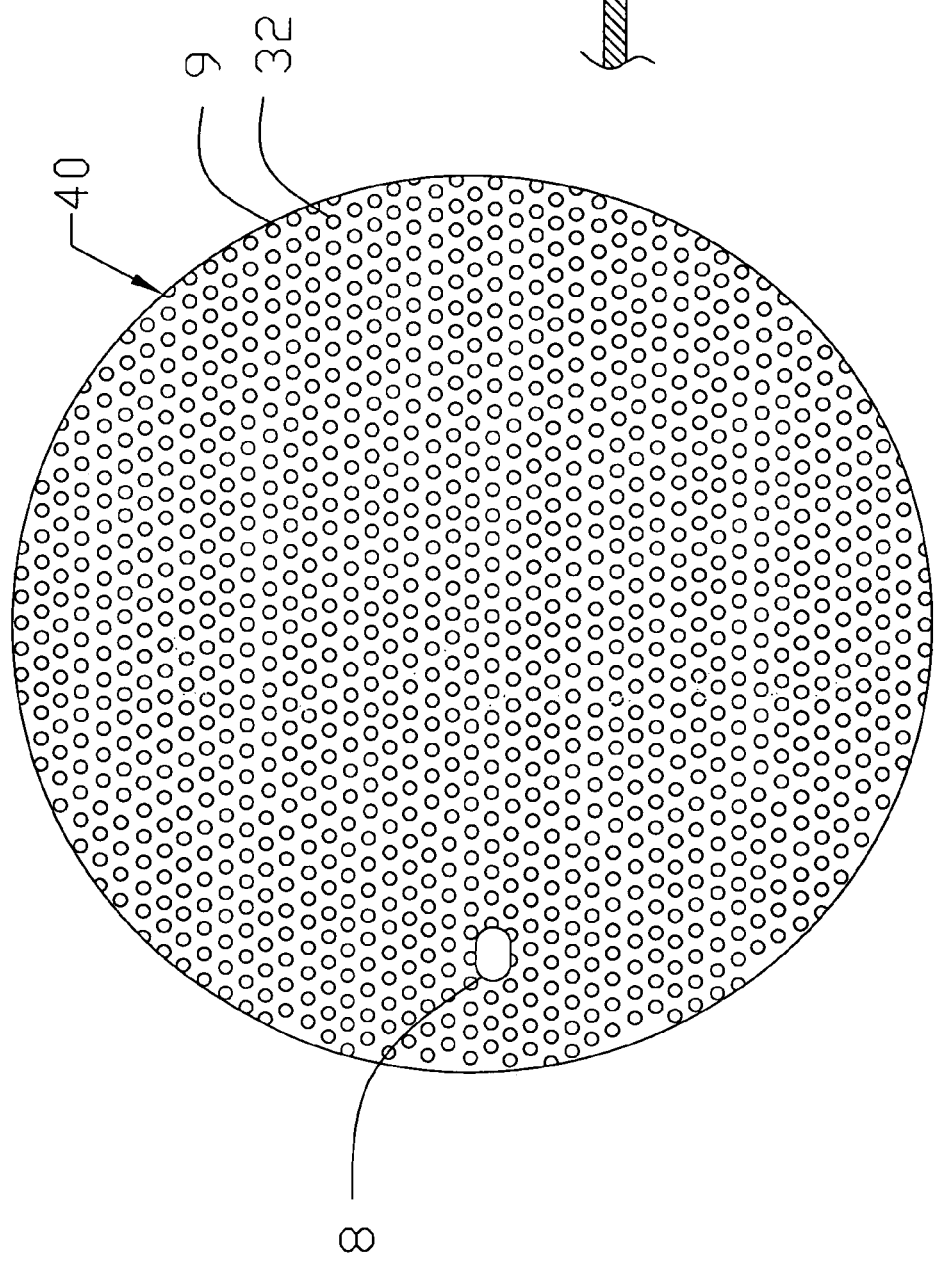
Fig 4 Prior Art

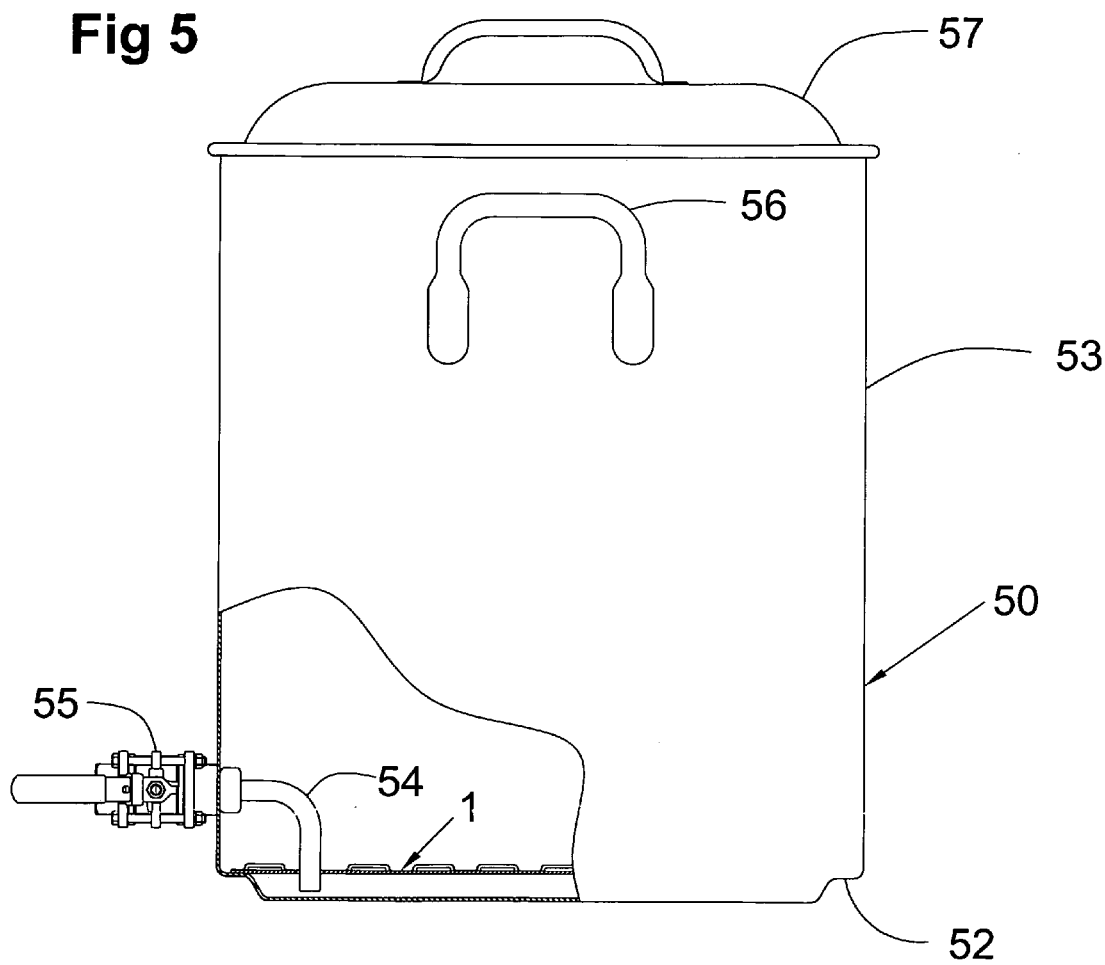

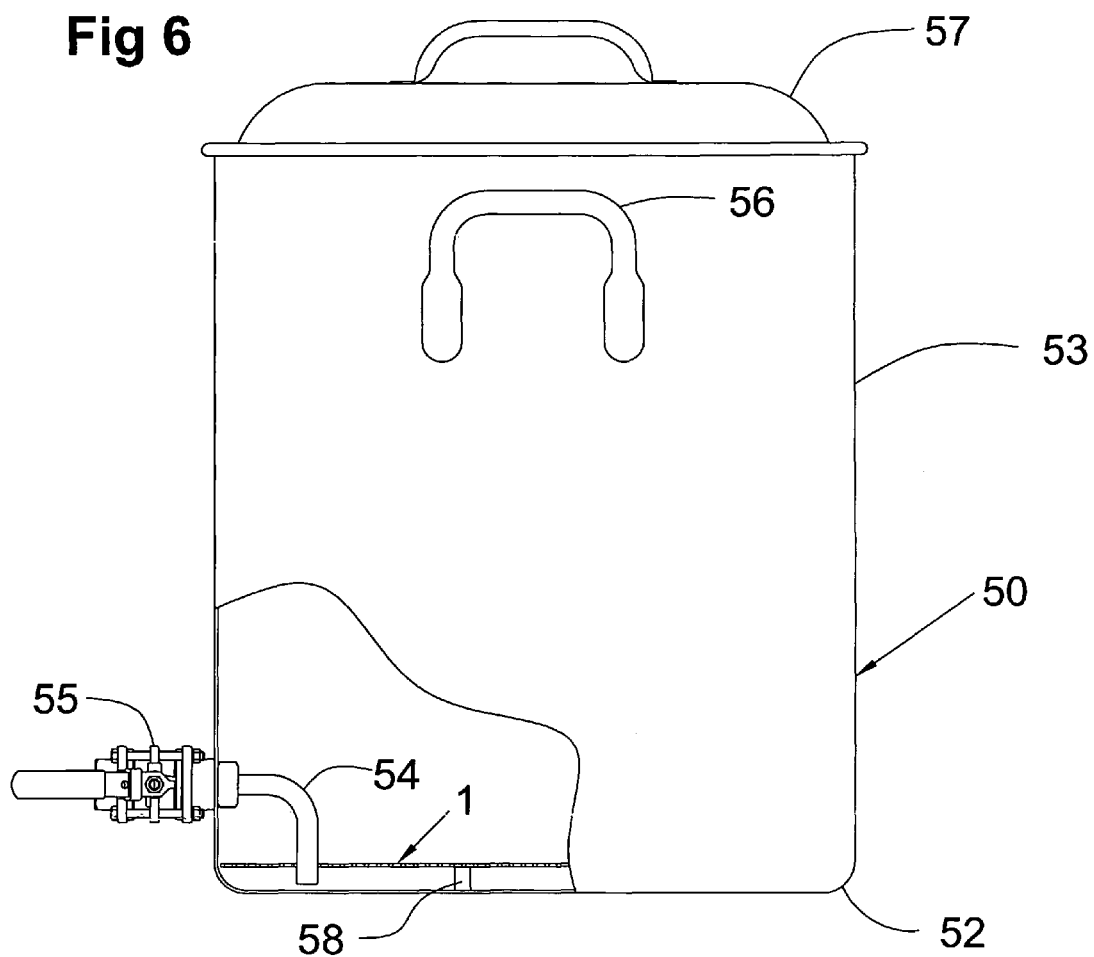

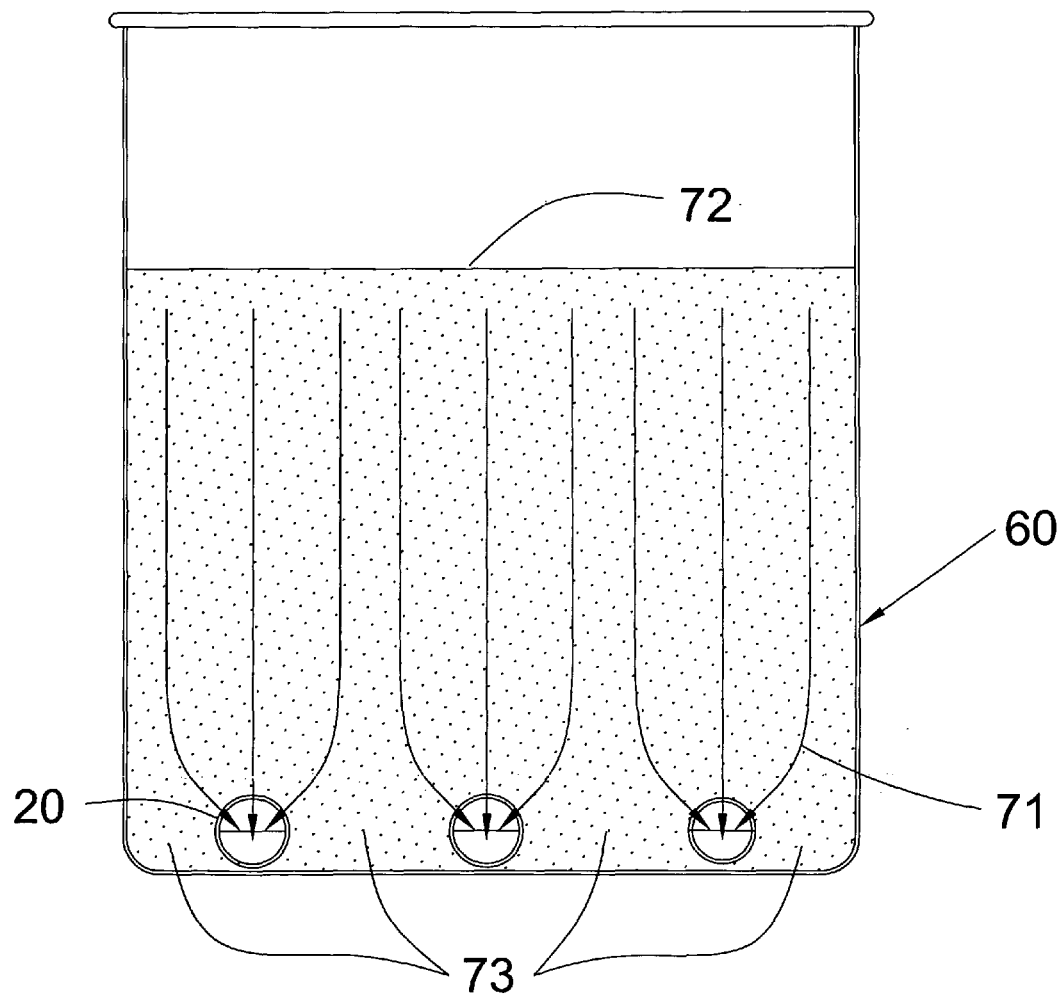

LAUTER TUN FALSE BOTTOM

DISCUSSION OF PRIOR ART

It is well known in the beer brewing industry to utilize a filtration system at the bottom of a lauter tun to filter the spent grains from the unfermented beer (wort) so that it can be transferred to the brew pot for further processing. Two methods are currently used. Method one is a perforated false bottom having openings extending through the false bottom. While this method has a nearly 100% even distribution of filtration, it tends to plug easily. Method two is a slotted manifold typically made from an assembly of copper pipe fittings where numerous slots have been sawed half way through and evenly spaced along the pipes. While this device does not plug easily, the filtration distribution is uneven due to the spacing of the manifold pipes and wort is wasted. The present invention overcomes both the tendency to plug, and the uneven filtration distribution, yielding a false bottom that is resistant to plugging and also exhibits even flow characteristics.

DESCRIPTION OF THE PREFERRED EMBODIMENTS

Referring to FIG. 1, a louvered false bottom 1 of a lauter tun is shown. This bottom has a plurality of raised louvers 7 more or less evenly spaced over the false bottom. Louvered false bottom has a top surface 4, a bottom surface 5, and an outer edge 9. In addition, louvered false bottom 1 has a drain tube hole 8. As shown in FIG. 1 and FIG. 1A, a raised louver 7 has a top surface 2, a bottom surface 3, a leg 6, and a slot 10. FIG. 2 and FIG. 2A show an embodiment of the invention, herein the plurality of louvers 7 are shaped in an elongated fashion. FIG. 3 shows a prior art slotted manifold assembly 20 made from elbows 22, tee's 23, slotted tube 25 and outlet cross 21. Tube 25, as best shown in FIG. 3A, has an inside surface 27 and an outside surface 26. A plurality of slots 3 are placed on tube 25, usually evenly spaced extending approximately half way through tube 25.

FIG. 4 shows a prior art perforated false bottom 40 also having a top surface 4, a bottom surface 5, and an outer edge 9 and a plurality of perforations 32. Best shown in FIG. 4A is perforation edge 31 placed between top surface 4 and bottom surface 5. FIG. 5 shows a pot assembly 50 having a stock pot wall 53, handles 56, lid 57, outlet valve 55, drain tube 54, ledge 52, and false bottom 1. FIG. 6 shows pot assembly 60 which is similar to pot 50 but does not have ledge 52 to support false bottom 1. In lieu of ledge 52, pot 60 utilizes a gap 59 interposed the stock pot wall 53 and the outer edge 9 of the false bottom 1. False bottom 1 is supported from the bottom of pot wall 53 by legs 58. FIG. 7A shows the prior art perforated false bottom 40 at the bottom of pot 60 supported by legs 58. Mash 72 is supported by perforated false bottom, preventing mash solids from passing therethrough. Flow lines 71 illustrate the natural flow of fluid through mash 72. Note that flow lines indicate an evenly distributed flow pattern. Referring now to FIG. 7B, mash 72 is supported by the prior art slotted manifold assembly 20, preventing mash solids from passing. Note that mash flow lines curve toward manifold assembly 20 leaving dead spots 73 in mash 72 where mash liquids (wort) do not get readily removed. FIG. 7C shows the louvered false bottom 1 of the present invention positioned at the bottom of pot 60 supported by legs 58. Mash 72 is supported by perforated false bottom 1, preventing mash solids from passing. Flow lines 71 illustrate the natural flow of fluid through mash 72. Note that flow lines indicate an evenly distributed flow pattern.

BRIEF DESCRIPTION OF THE DRAWINGS

FIG. 3A is a sectional view of the prior art slotted manifold;
FIG. 4 is a view of a prior art false bottom;
FIG. 4A is a sectional view of the prior art false bottom;
FIG. 5 is side view of a pot assembly having a section therein;
FIG. 6 is side view of a similar pot assembly having a section therein;
FIG. 7B shows an embodiment of the invention and the flow therethrough.

OPERATION OF THE PREFERRED EMBODIMENT

Figure 1A:
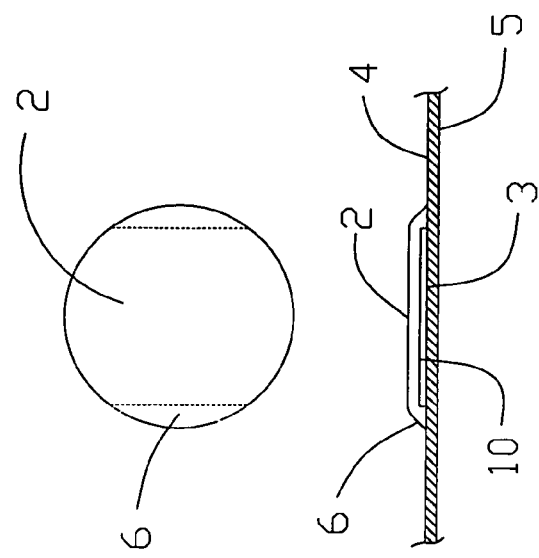
FIG. 1A is a sectional view of one of the louvers of the false bottom.
Figure 1:
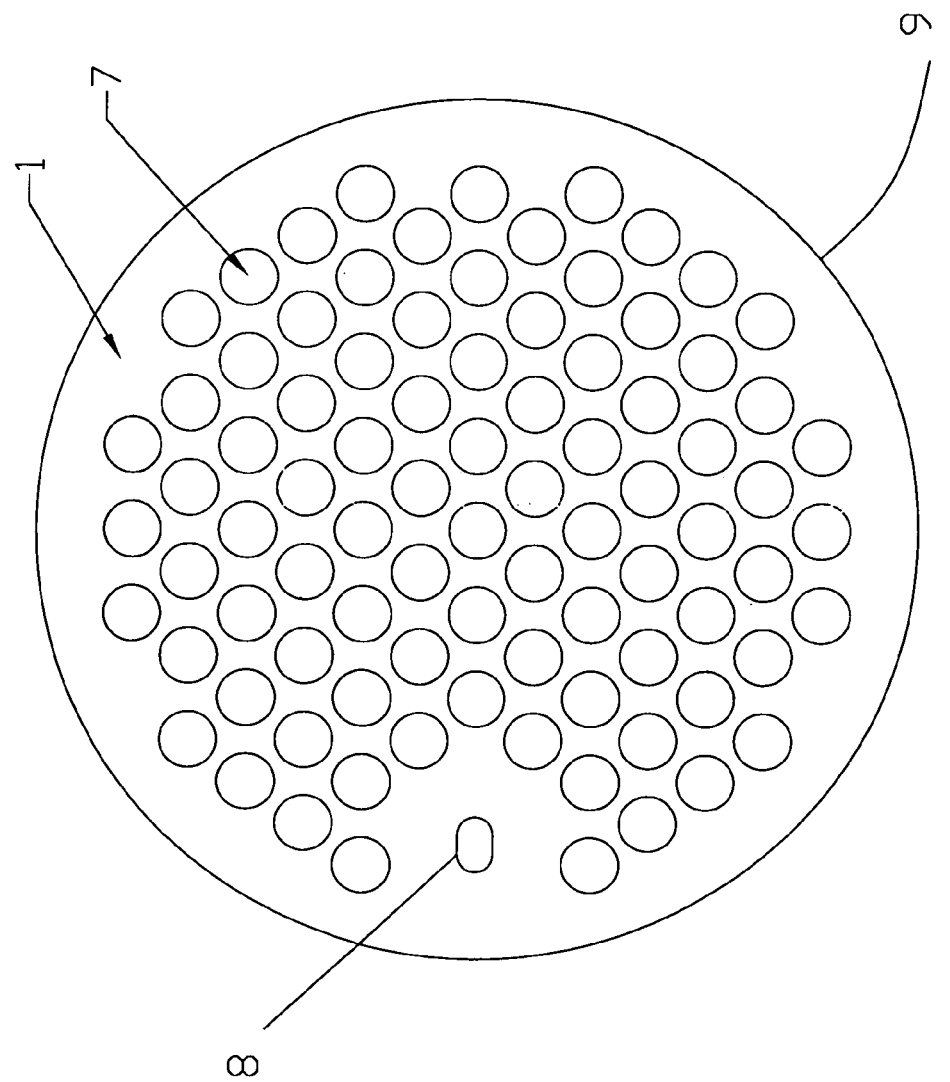
FIG. 1 is a plane view of a louvered false bottom.
Figure 2A:
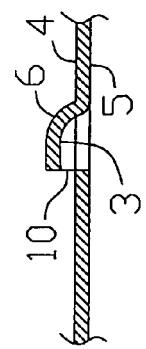
FIG. 2A is a sectional view of one of the alternate embodiment of the false bottom.
Figure 2:
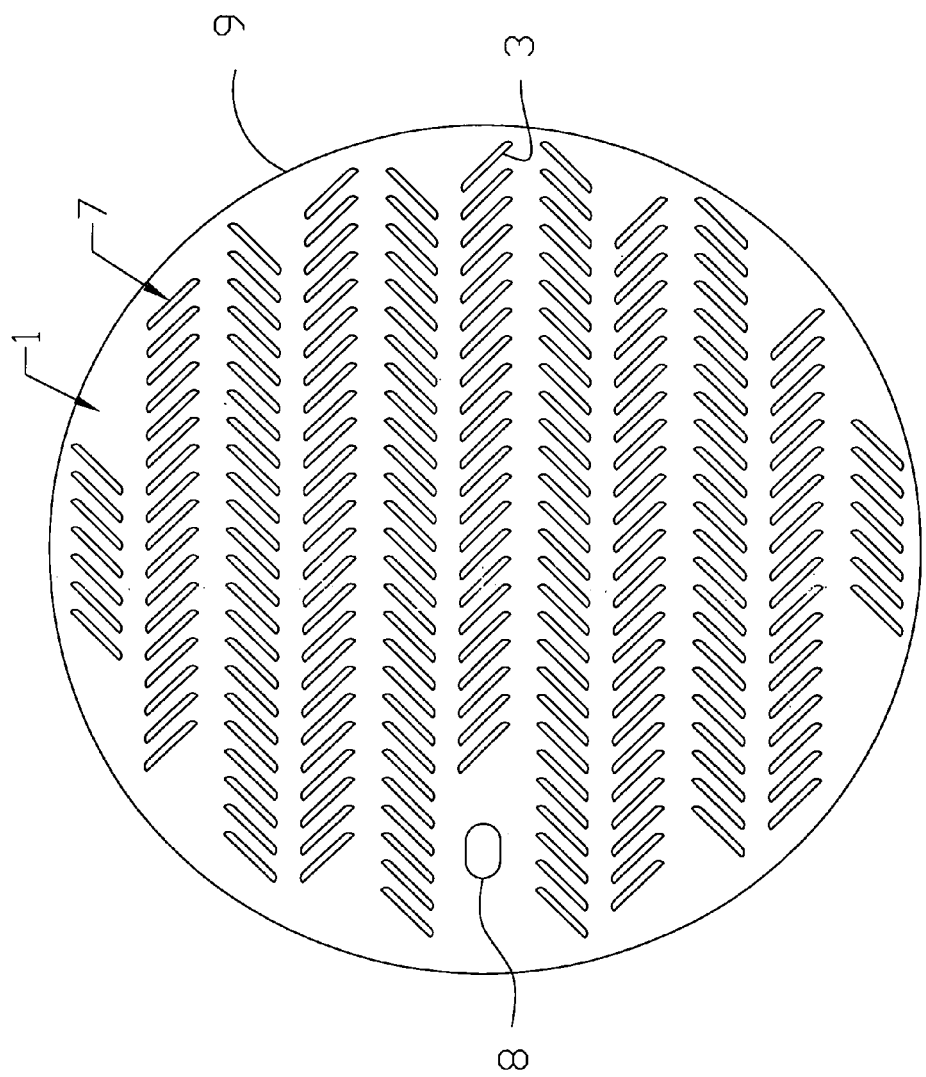
FIG. 2 is an alternate embodiment of the false bottom.
Figure 3:
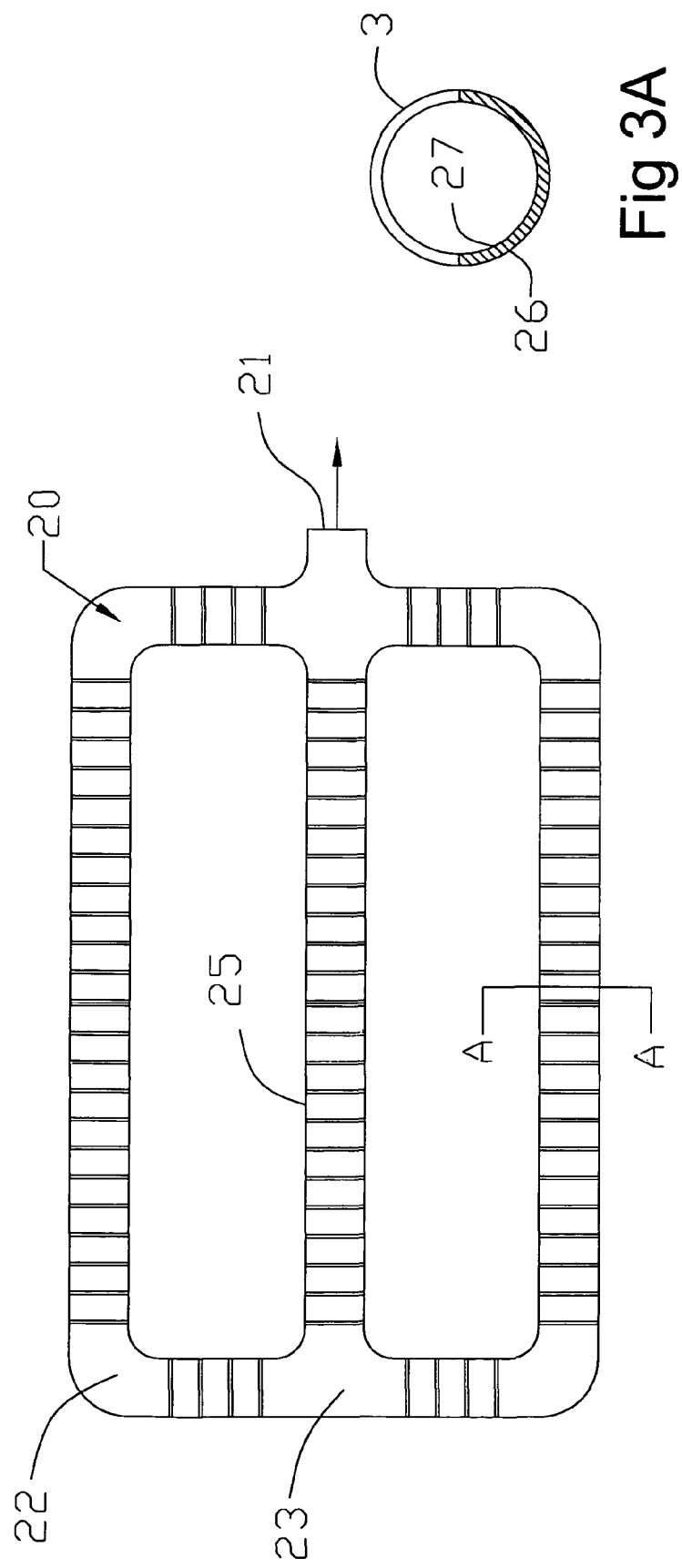
FIG. 3 is a view of a prior art slotted manifold.
Figure 7A:
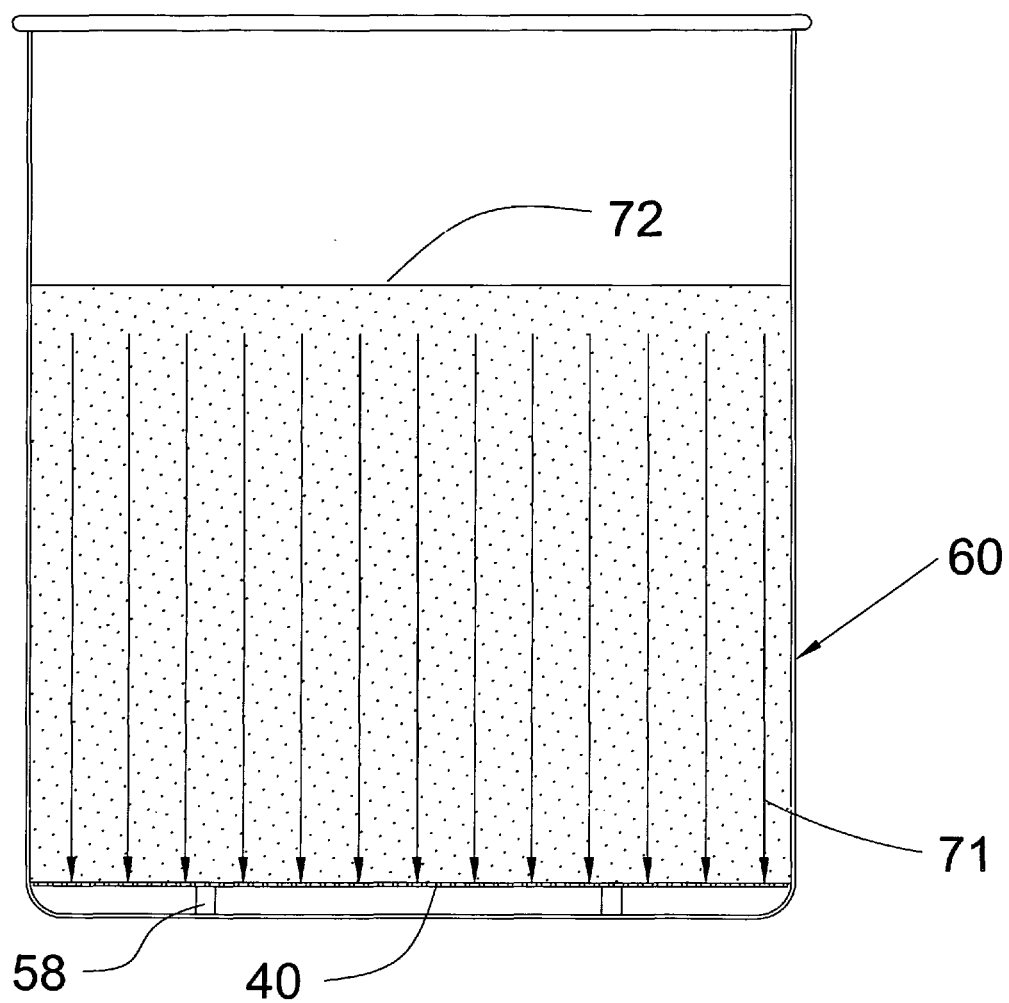
FIG. 7A shows an embodiment of the false bottom and the flow therethrough.
Figure 7C:
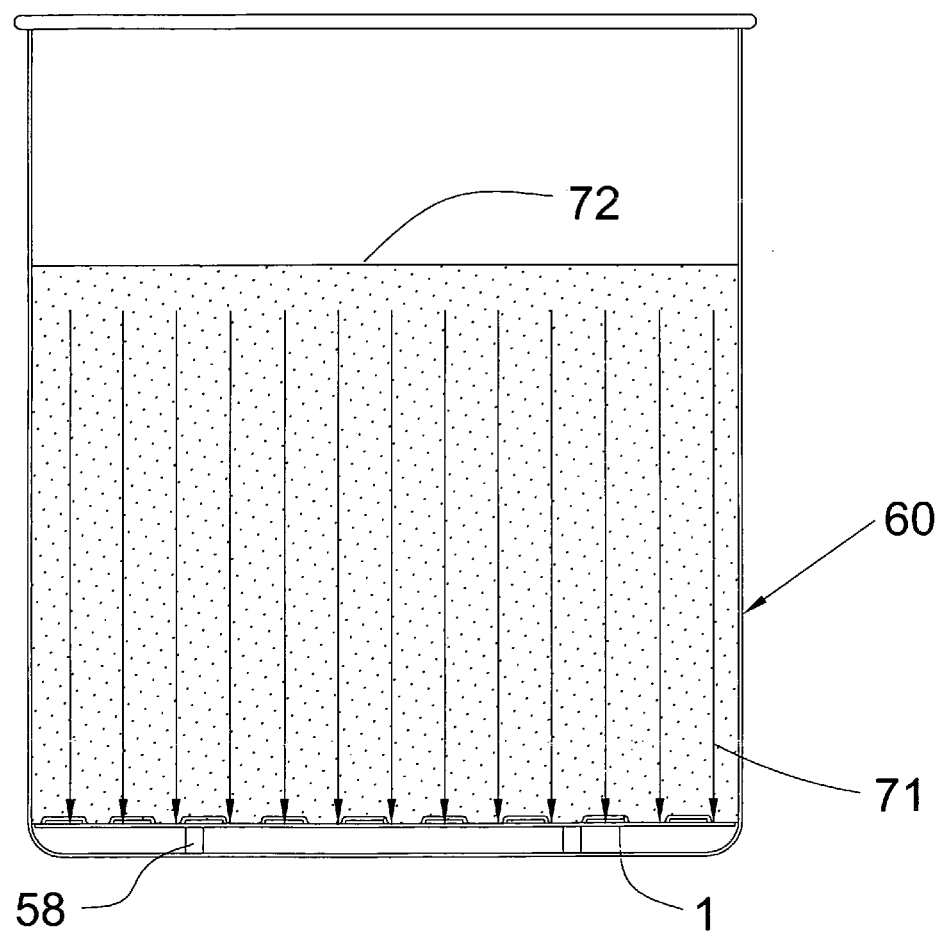
FIG. 7C shows an embodiment of the false bottom and the flow therethrough.

Referring to FIG. 7C, mash 72, comprising crushed grains and hot water, is filtered (lautered) through louvered false bottom 1. Referring to FIG. 1A, grain particles are trapped prior to entering in slot 10 which is approximately 0.030 inches tall allowing mash liquids to easily pass through slot 10 and be collected and run off for further processing, while particles are trapped along slot 10 but not wedged into slot 10 which would cause plugging and reduced flow. Louvers 7 are evenly distributed across the top surface 4 of louvered false bottom 1 (best shown in FIG. 1) to encourage an even flow path through the mash 72, as shown in FIG. 7C, and maximize the open area for maximum potential flow. Slot 10 can be made larger or smaller according to the grain crush size to allow for maximum flow rate with minimal plugging. For example, smaller grain crush requires a smaller slot and a larger grain crush requires a larger slot. Referring to FIG. 5, false bottom 1 sits on ledge 52 which created a seal against the pot and the false bottom which becomes tighter the harder the mash is drawn upon creating a near perfect seal with negligible sidewall shunting (bypass) of the mash rinse water. Alternately, as shown in FIG. 6, a tight fit of louvered false bottom 1 to stock pot wall 53 creating the minimal gap 59 will also adequately reduce sidewall shunting. Referring to FIG. 7C, FIG. 1, and FIG. 6 respectively, mash liquids are drawn into the opening below louvered false bottom 1 and removed through drain tube 54 which is placed in hole 8. Mash liquids then being run to another vessel for further processing.

Ramifications

Many ramifications of the invention are possible. For example, numerous profiles of louvers and stamping patterns on the sheet are possible. Square, rectangular, triangular, hexagonal, louver shaped, and virtually any shape can be created. Similarly, a variety of patterns can be utilized such as staggered, random, chevron or numerous other patterns. Since many lauter/mash tuns are rectangular, it is obvious that the present invention could be formed to fit into any lauter/mash tun shape conceivable. In addition, numerous methods to support the false bottom are possible such as coiled bar, depressions stamped into the sheet, bolts, studs etc. While the preferred material is stainless steel, it is obvious that any material that can be formed and is compatible with wort is acceptable. Such materials being copper, brass, aluminum, plated steel, and plastic to name a few.

What is claimed is:

1. A brewing apparatus having a filtering system therein for filtering a spent grain from an unfermented liquid, said filtering system comprising:
   one of a lauter tun and a pot and a pot assembly having a stock pot wall, a lid being positioned in sealing relationship with said stock pot wall, and a drain tube extending through said stock pot wall;
   a false bottom being positioned in said pot assembly, said false bottom having a top surface and a bottom surface being positioned opposite said top surface, an outer edge, and a plurality of raised louvers extending though said false bottom, each of said plurality of raised louvers having a top surface and a bottom surface being positioned opposite said top surface, a leg extending from said top surface of said false bottom to said top surface of said plurality of raised louvers, and a slot being positioned between said top surface of said false bottom and said bottom surface of said plurality of raised louvers;
   an opening interposed said bottom surface of said false bottom and said stock pot wall, said opening including a drain tube hole through which is positioned said drain tube, said drain tube exiting said stock pot wall; and
   an outlet valve being positioned externally of said pot assembly and being connected with said drain tube.

2. The brewing apparatus having a filtering system therein for filtering a spent grain from an unfermented liquid of claim 1 wherein said leg has a preestablished height, said preestablished height being determined by a grain crush size of said spent grain.

3. The brewing apparatus having a filtering system therein for filtering a spent grain from an unfermented liquid of claim 1 wherein said slot having a preestablished open area, said preestablished open area being determined by a grain crush size of said spent grain.

4. The brewing apparatus having a filtering system therein for filtering a spent grain from an unfermented liquid of claim 1 wherein said outer edge of said false bottom and said stock pot wall are in a sealing relationship.

5. The brewing apparatus having a filtering system therein for filtering a spent grain from an unfermented liquid of claim 1 wherein said stock pot wall has a ledge and said bottom surface of said false bottom and said ledge are in a sealing relationship.

6. The brewing apparatus having a filtering system therein for filtering a spent grain from an unfermented liquid of claim 1 wherein said plurality of raised louvers have a profile and said profile being one of a square, a rectangular, a triangular, a hexagonal and an oblong configuration.

7. The brewing apparatus having a filtering system therein for filtering a spent grain from an unfermented liquid of claim 1 wherein said plurality of raised louvers have a pattern and said pattern being one of a staggered, a random, and a chevron.

8. The brewing apparatus having a filtering system therein for filtering a spent grain from an unfermented liquid of claim 1 wherein said pot assembly has a circular configuration and said outer edge of said false bottom has a circular configuration.

9. The brewing apparatus having a filtering system therein for filtering a spent grain from an unfermented liquid of claim 1 wherein said pot assembly has a rectangular configuration and said outer edge of said false bottom has a rectangular configuration.

10. The brewing apparatus having a filtering system therein for filtering a spent grain from an unfermented liquid of claim 1 wherein said pot assembly has a preestablished configuration and said outer edge of said false bottom has an identical preestablished configuration.

11. A filtering system, said filtering system filtering a spent grain from an unfermented liquid comprising:
    a pot assembly having a stock pot wall, a lid being positioned in sealing relationship with said stock pot wall, and a drain tube extending through said stock pot wall;
    a false bottom being positioned in said pot assembly, said false bottom having a top surface and a bottom surface being positioned opposite said top surface, an outer edge, and a plurality of raised louvers extending though said false bottom, each of said plurality of raised louvers having a top surface and a bottom surface being positioned opposite said top surface, a leg extending from said top surface of said false bottom to said top surface of said plurality of raised louvers, and a slot being positioned between said top surface of said false bottom and said bottom surface of said plurality of raised louvers;
    an opening interposed said bottom surface of said false bottom and said stock pot wall, said opening including a drain tube hole through which is positioned said drain tube, said drain tube exiting said stock pot wall; and
    an outlet valve being positioned externally of said pot assembly and being connected with said drain tube.

12. The filtering system of claim 11 wherein said leg has a preestablished height, said preestablished height being determined by a grain crush size of said spent grain.

13. The filtering system of claim 11 wherein said slot having a preestablished open area, said preestablished open area being determined by a grain crush size of said spent grain.

14. The filtering system of claim 11 wherein said outer edge of said false bottom and said stock pot wall are in a sealing relationship.

15. The filtering system of claim 11 wherein said stock pot wall has a ledge and said bottom surface of said false bottom and said ledge are in a sealing relationship.

16. The filtering system of claim 11 wherein said plurality of raised louvers have a profile and said profile being one of a square, a rectangular, a triangular, a hexagonal and an oblong configuration.

17. The filtering system of claim 11 wherein said plurality of raised louvers have a pattern and said pattern being one of a staggered, a random, and a chevron.

18. A method of filtering a spent grain from an unfermented liquid, said method of filtering comprising the steps of:
    removing a lid from a pot assembly;
    positioning a false bottom within said pot assembly, said false bottom having an outer edge and said pot assembly having a stock pot wall, said outer edge and said stock pot wall being in sealing relationship preventing sidewall shunting of said spent grain;
    positioning a plurality of raised louvers in said false bottom, said plurality of raised louvers forming a slot and a leg;
    positioning said leg of said plurality of raised louver toward said lid;

forming an opening below said false bottom and a bottom of said pot assembly, said unfermented liquid draining though said slot of said plurality of raised louvers;

maintaining said spent grain above said opening with said leg;

draining said unfermented liquid from said opening wherein said opening comprising the step of said false bottom including a drain tube hole having a drain tube positioned therein and exiting said stock pot wall of said pot assembly and draining through an outlet valve.

19. The method of filtering a spent grain from an unfermented liquid of claim 18 wherein said step of positioning a false bottom comprising the step of: said pot assembly including a ledge and said false bottom including a bottom surface and said bottom surface being in sealing relationship with said ledge.

* * * * *